(12) United States Patent
Hara

(10) Patent No.: US 10,654,170 B2
(45) Date of Patent: May 19, 2020

(54) ROBOT

(71) Applicant: Seiko Epson Corporation, Tokyo (JP)

(72) Inventor: Tatsuya Hara, Chino (JP)

(73) Assignee: Seiko Epson Corporation (JP)

(*) Notice: Subject to any disclaimer, the term of this patent is extended or adjusted under 35 U.S.C. 154(b) by 127 days.

(21) Appl. No.: 15/936,981

(22) Filed: Mar. 27, 2018

(65) Prior Publication Data
US 2018/0281198 A1 Oct. 4, 2018

(30) Foreign Application Priority Data
Mar. 30, 2017 (JP) ................. 2017-069273

(51) Int. Cl.
B25J 13/00 (2006.01)
H04B 10/25 (2013.01)
B25J 19/02 (2006.01)
H04B 10/80 (2013.01)
B25J 13/08 (2006.01)

(52) U.S. Cl.
CPC ............ B25J 13/00 (2013.01); B25J 19/025 (2013.01); H04B 10/25 (2013.01); H04B 10/80 (2013.01); B25J 13/088 (2013.01); Y10S 901/28 (2013.01)

(58) Field of Classification Search
CPC ........ B25J 19/025; B25J 13/00; B25J 13/088; H04B 10/25
See application file for complete search history.

(56) References Cited

U.S. PATENT DOCUMENTS

| 4,767,257 A | 8/1988 | Kato | |
| 4,808,064 A * | 2/1989 | Bartholet | B25J 9/1692 |
| | | | 356/139.03 |
| 4,816,728 A * | 3/1989 | Kurakake | B25J 17/02 |
| | | | 318/480 |
| 4,818,174 A * | 4/1989 | Arpiarian | B25J 19/025 |
| | | | 338/15 |
| 5,712,552 A * | 1/1998 | Hirai | B25J 19/0029 |
| | | | 318/568.1 |
| 7,687,768 B2 * | 3/2010 | Hashizume | G06F 1/1616 |
| | | | 250/221 |
| 2004/0170363 A1 * | 9/2004 | Angela | B25J 19/0029 |
| | | | 385/100 |
| 2009/0067074 A1 | 3/2009 | Koitabashi | |
| 2016/0091117 A1 * | 3/2016 | Boccoleri | F16M 11/10 |
| | | | 348/804 |

FOREIGN PATENT DOCUMENTS

| FR | 2664525 A1 * | 1/1992 | ........ B25J 15/0616 |
| JP | 62-199380 A | 9/1987 | |
| JP | 2009-171536 A | 7/2009 | |

* cited by examiner

Primary Examiner — Thomas C Diaz
(74) Attorney, Agent, or Firm — Harness, Dickey & Pierce, P.L.C.

(57) ABSTRACT

A robot includes a robot arm having a first joint part and a second joint part located closer to a distal end side than the first joint part, an optical fiber the performs optical communications within the first joint part, and a first optical space transmission section that performs optical space transmission within the second joint part. The robot arm has a plurality of joint parts, and the second joint part is the joint part located on the most distal end side of the plurality of joint parts.

7 Claims, 8 Drawing Sheets

ROBOT

BACKGROUND

1. Technical Field

The present invention relates to a robot.

2. Related Art

Robots including optical fibers provided inside of robot arms having joint parts are known (for example, Patent Document 1 (JP-A-62-199380)).

In an industrial robot system described in Patent Document 1, an optical cable for control signal provided from a robot main body over a robot arm to a hand device is divided in the placement direction and the divided cables are relayed by rotary joints. Here, the rotary joints are provided on respective drivers (joint parts) of the robot arm.

However, in the industrial robot described in Patent Document 1, the rotary joints are provided on all of the joint parts of the robot arm, and there is a problem that light loss in the rotary joints is larger and communication performance is lower.

SUMMARY

An advantage of some aspects of the invention is to provide a robot that may realize better communication performance with a smaller and lighter-weight joint part.

The invention can be implemented as the following application examples or embodiments.

A robot according to this application example includes a robot arm having a first joint part and a second joint part located closer to a distal end side than the first joint part, an optical fiber that performs optical communications within the first joint part, and a first optical space transmission section that performs optical space transmission within the second joint part.

According to the robot, the optical fiber performs optical communications within the first joint part, and thereby, communication characteristics with low loss by the optical fiber may be utilized. Further, the optical space transmission section performs optical space transmission within the second joint part, and thereby, the degree of freedom of design of the joint part (e.g. the degree of freedom of not only the routing of wires for optical communications but also routing of electrical wires) is higher and, as a result, the second joint part may be made smaller and lighter. As described above, the better communication performance may be realized with the smaller and lighter-weight joint part. Note that "optical space transmission" refers to communications by propagation (transmission) of light via a space (gas).

In the robot according to the application example, it is preferable that a joint part on the most distal end side of the robot arm is the second joint part.

Generally, in a robot arm having a plurality of joint parts, the joint part on the most distal end side is rotatable in a larger angle range. If an optical fiber is used for the joint part on the most distal end side, bending and torsion of the optical fiber may easily go beyond an allowable range. Accordingly, the optical space transmission section is provided in the joint part on the most distal end side, and thereby, the problem in the case using the optical fiber may be solved.

In the robot according to the application example, it is preferable that an end effector connected to a distal end of the robot arm is provided.

With this configuration, for example, a signal of a sensor or the like provided in an end effector may be transmitted to the optical fiber side via the optical space transmission section.

In the robot according to the application example, it is preferable that a sensor is provided on a side closer to the distal end of the robot arm than the second joint part.

With this configuration, a signal from the sensor may be transmitted to the optical fiber side via the optical space transmission section.

In the robot according to the application example, it is preferable that the robot arm has a third joint part located between the first joint part and the second joint part, and a second optical space transmission section that performs optical space transmission within the third joint part is provided.

With this configuration, the optical space transmission is performed not only in the joint part on the most distal end side but also in the other joint part having the larger rotatable range of the plurality of joint parts of the robot arm, and thereby, the problem in the case using the optical fiber may be solved.

In the robot according to the application example, it is preferable that the robot arm has two arms rotatably provided via the second joint part, and the first optical space transmission section has a light emitting device provided on one arm side of the two arms and outputting light, and a light receiving device provided on the other arm side of the two arms and receiving light from the light emitting device.

With this configuration, an electric signal may be converted into an optical signal and the optical space transmission may be performed using the light emitting device. Further, the received optical signal may be once converted into the electric signal and necessary processing (e.g. amplification) may be performed thereon, and deterioration of communication characteristics (light intensity reduction) due to the optical space transmission may be reduced using the light receiving device.

In the robot according to the application example, it is preferable that the first optical space transmission section has a first lightguide part provided on the one arm side and guiding the light from the light emitting device to the other arm side, and a second lightguide part provided on the other arm side and guiding light from the first lightguide part to the light receiving device.

With this configuration, the degree of freedom of placement of the light emitting device and the light receiving device may be increased, and thus, the degree of freedom of design of the second joint part may be increased.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a robot according to the invention will be explained in detail based on embodiments shown in the accompanying drawings.

First Embodiment

Figure 1:
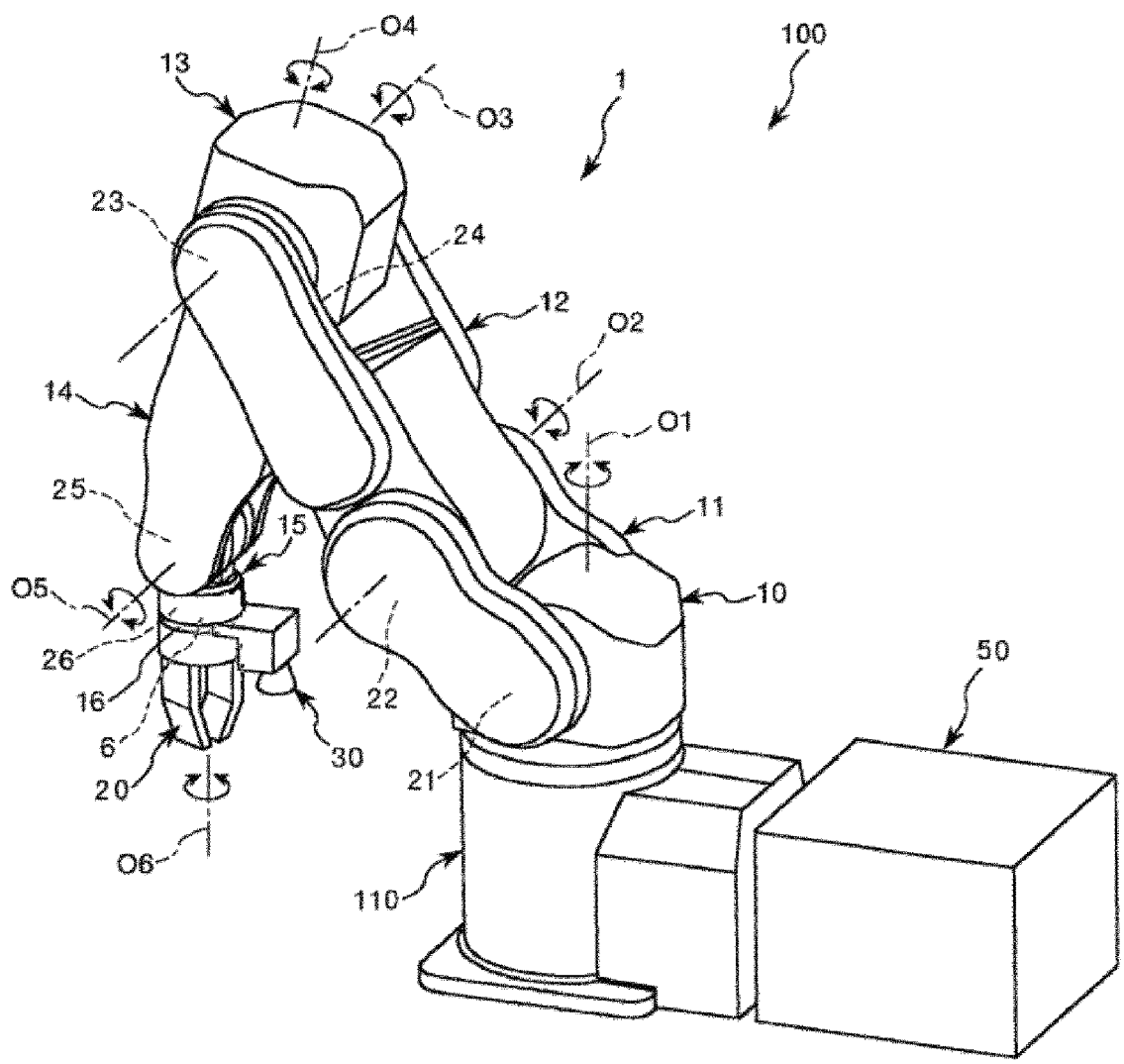
FIG. 1 is a perspective view showing a robot according to a first embodiment of the invention.
Figure 2:
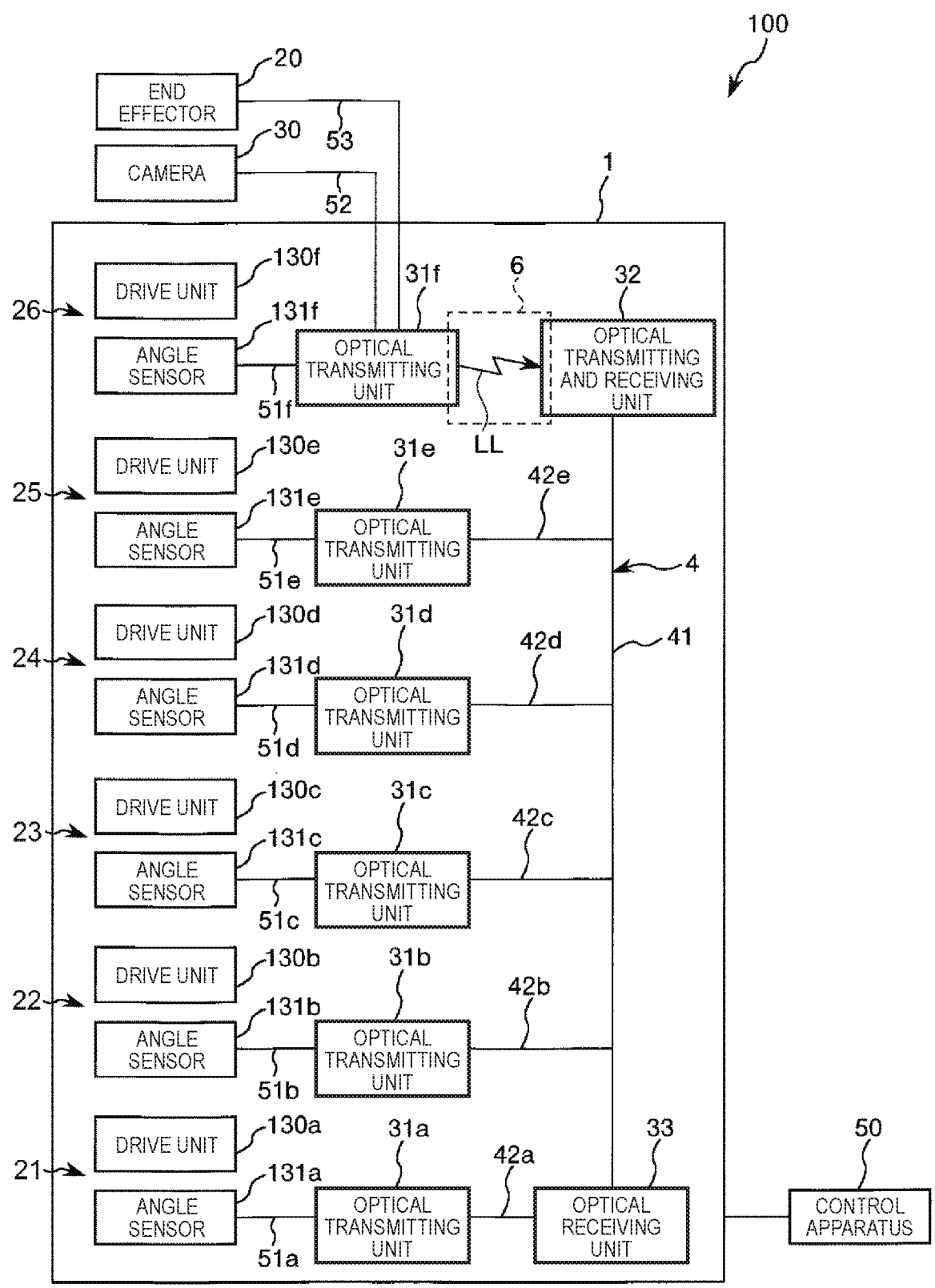
FIG. 2 is a block diagram of the robot shown in FIG. 1.
Figure 3:
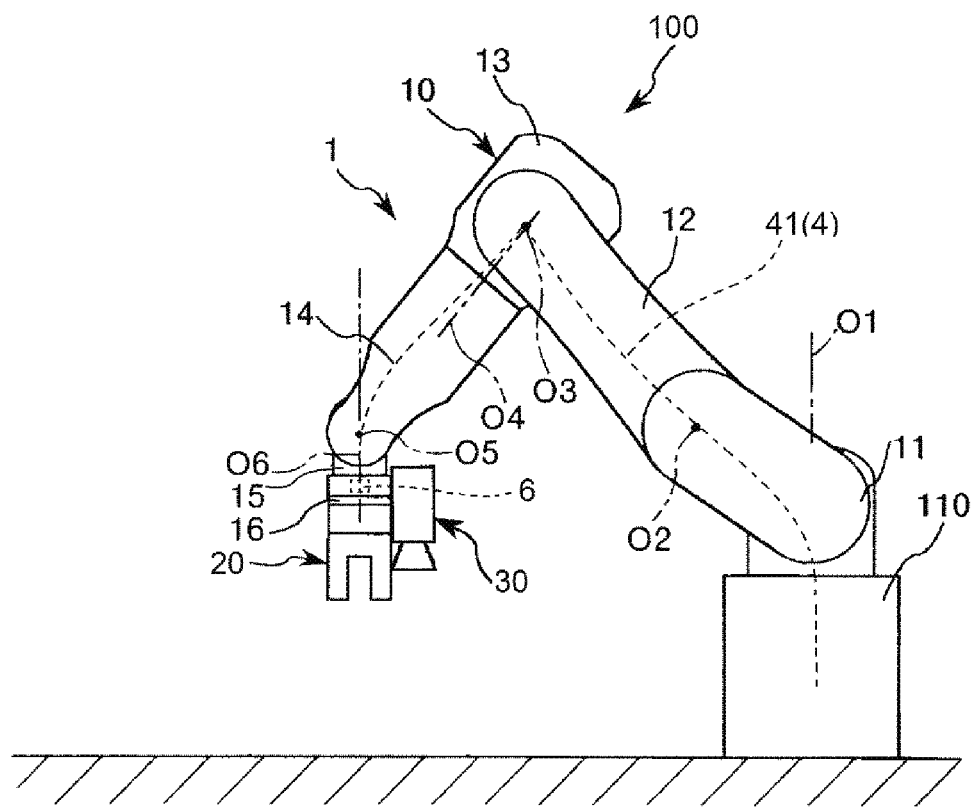
FIG. 3 is a side view of a robot main body of the robot shown in FIG. 1.

FIG. 1 is a perspective view showing a robot according to the first embodiment of the invention. FIG. 2 is a block diagram of the robot shown in FIG. 1. FIG. 3 is a side view of a robot main body of the robot shown in FIG. 1. Note that, hereinafter, for convenience of explanation, a side of a base 110 of the robot is referred to as "proximal end side" and the opposite side (a side of an end effector 20) is referred to as "distal end side".

Robot

A robot 100 shown in FIG. 1 is the so-called six-axis vertical articulated robot, and may perform e.g. work including supply, removal, carrying, and assembly of precision apparatuses and components (objects) forming the apparatuses. The robot 100 includes a robot main body 1, a robot control apparatus 50 that controls driving of the robot main body 1, and a camera 30.

Here, the robot main body 1 of the robot 100 has an optical space transmission section 6 (first optical space transmission section) in or near a second joint part (joint part 26), and can transmit information (signals) obtained from the camera 30 etc. to the control apparatus 50 by optical communications via the optical space transmission section. Note that electric power supply to the robot main body 1 is performed using electrical wiring (not shown). As below, prior to the explanation of the optical space transmission section 6, first, an outline of the respective parts of the robot 100 will be explained.

The robot main body 1 has the base 110 and a robot arm 10. The robot arm 10 has a first arm 11 (arm), a second arm 12 (arm), a third arm 13 (arm), a fourth arm 14 (arm), a fifth arm 15 (arm), and a sixth arm 16 (arm, distal end arm).

Here, the first arm 11 is coupled to the base 110 via a joint part 21 rotatably about a first rotation axis O1 along the vertical direction. The second arm 12 is coupled to the first arm 11 via a joint part 22 rotatably about a second rotation axis O2 along the horizontal direction. The third arm 13 is coupled to the second arm 12 via a joint part 23 rotatably about a third rotation axis O3 along the horizontal direction. The fourth arm 14 is coupled to the third arm 13 via a joint part 24 rotatably about a fourth rotation axis O4 orthogonal to the third rotation axis O3. The fifth arm 15 is coupled to the fourth arm 14 via a joint part 25 rotatably about a fifth rotation axis O5 orthogonal to the fourth rotation axis O4. The sixth arm 16 is coupled to the fifth arm 15 via the joint part 26 rotatably about a sixth rotation axis O6 orthogonal to the fifth rotation axis O5. The end effector 20 is attached to the distal end surface of the sixth arm 16. The camera 30 is attached to a side surface of the sixth arm 16. Note that, in the specification, "joint part" has a function of bending or rotating two members (adjacent arms) coupled thereby.

Further, as shown in FIG. 2, the robot main body 1 has drive units 130a to 130f, angle sensors 131a to 131f, optical transmitting units 31a to 31f, an optical transmitting and receiving unit 32, an optical receiving unit 33, and an optical transmission unit 4.

The drive unit 130a is provided in the above described joint part 21 and generates drive power to rotate the first arm 11 with respect to the base 110. Similarly, the drive units 130b to 130f are provided in the above described joint parts 22 to 26 and generate drive power to rotate the second arm 12 to sixth arm 16, respectively. The drive units 130a to 130f respectively include e.g. motors and reducers.

The angle sensor 131a is provided in the above described joint part 21 and detects the rotation state (e.g. rotation angle) of the first arm 11 with respect to the base 110. Similarly, the angle sensors 131b to 131f are provided in the above described joint parts 22 to 26 and detect the rotation states of the second arm 12 to sixth arm 16, respectively. The angle sensors 131a to 131f respectively include e.g. magnetic or optical rotary encoders.

The optical transmitting unit 31a is electrically (electrically conductive) connected to the angle sensor 131a via an electric wire 51a and has a function of converting an electric signal (angle information) from the angle sensor 131a into an optical signal and outputting the signal. Similarly, the optical transmitting units 31b to 31f are electrically (electrically conductive) connected to the angle sensors 131b to 131f via electric wires 51b to 51f and have functions of converting electric signals from the angle sensors 131b to 131f into optical signals and outputting the signals, respectively. The optical transmitting units 31a to 31f are respectively e.g. transmitting optical sub-assemblies (TOSA) and include light emitting devices (e.g. semiconductor lasers, light emitting diodes, or the like) and circuits that drive the light emitting devices based on the electric signals to emit optical signals according to the electric signals. Further, the optical transmitting units 31a to 31f may be adapted to transmit optical signals in a time-sharing system with one another.

In the embodiment, the optical transmitting unit 31f is electrically (electrically conductive) connected to the camera 30 via an electric wire 52 and electrically (electrically conductive) connected to the end effector 20 via an electric wire 53 in addition to the angle sensor 131f. Further, the optical transmitting unit 31f has a function of converting an electric signal (imaging information) from the camera 30 into an optical signal and outputting the signal and a function of converting an electric signal from the end effector 20 (e.g. a sensor such as a contact sensor of the end effector 20) into an optical signal and outputting the signal.

The camera 30 includes e.g. an imaging device such as a CCD (Charge Coupled Device) or CMOS (Complementary Metal Oxide Semiconductor) and a lens (optical system). The camera 30 outputs an electric signal according to imaging information obtained by imaging of an object to be imaged. The imaging information of the camera 30 may be used for e.g. calibration of the robot arm 10 in the reference coordinate system, teaching of the position of an object, or the like. The camera 30 is placed in or near the sixth arm 16, but the placement location of the camera 30 is not limited to that.

The optical transmitting and receiving unit 32 has a function of receiving the optical signal (light LL shown in FIG. 2) from the optical transmitting unit 31f and transmitting the same optical signal as the optical signal from the optical transmitting unit 31f (or e.g. an optical signal on which processing such as amplification has been performed as appropriate) to the optical receiving unit 33. Here, the optical transmitting and receiving unit 32 performs optical communications with the optical transmitting unit 31f by optical space transmission. The part that performs the optical space transmission forms the optical space transmission section 6. The optical transmitting and receiving unit 32 includes e.g. a transmitting optical sub-assembly (TOSA) and a receiving optical sub-assembly (ROSA), and more specifically, includes a light receiving device (photodiode or the like) that receives and coverts an optical signal into an electric signal (current), a light emitting device (e.g. semiconductor laser, light emitting diode, or the like) and a circuit that drives the light emitting device based on the electric signal to emit an optical signal according to the electric signal of the light receiving device. Note that the optical space transmission section 6 will be described later in detail.

The optical receiving unit 33 is optically (optically communicably) connected to the optical transmitting units 31a to 31e and the optical transmitting and receiving unit 32 via the optical transmission unit 4, and has a function of receiving optical signals from the units and converting the optical signals into electric signals and output the signals. The output is input to the control apparatus 50. Thereby, the control apparatus 50 may obtain the angle information of the angle sensors 131a to 131f and the imaging information of the camera 30. The optical receiving unit 33 is e.g. a receiving optical sub-assembly (ROSA) and includes a light receiving device (photodiode or the like) that receives and converts an optical signal into an electric signal (current) and a circuit including an amplifier circuit that amplifies the electric signal of the light receiving device etc.

Here, the optical transmission unit 4 has an optical fiber 41 (optical wire) optically (optically communicably) connecting the optical transmitting and receiving unit 32 and the optical receiving unit 33, an optical wire 42a optically (optically communicably) connecting the optical transmitting unit 31a and the optical receiving unit 33, and optical wires 42b to 42e optically (optically communicably) connecting the optical transmitting units 31b to 31f and the optical fiber 41.

As shown in FIG. 3, the optical fiber 41 is routed from the base 110 through inside of the robot arm 10 to the fifth arm 15. Therefore, the optical fiber 41 passes through inside of the respective above described joint parts 21 to 26 (first, second joint parts). Further, the optical wires 42a to 42e are respectively e.g. optical fibers or optical waveguides. Note that optical couplers, optical switches, etc. may be provided between the optical wires 42b to 42e and the optical fiber 41 as appropriate. Or, the respective optical wires 42b to 42e may be connected directly to the optical receiving unit 33 not via the optical fiber 41.

The control apparatus 50 shown in FIGS. 1 and 2 has a function of controlling driving of the robot main body 1 and the camera 30. The control apparatus 50 may be formed using a personal computer (PC) containing e.g. a CPU (Central Processing Unit), ROM (Read Only Memory), and RAM (Random Access Memory) or the like. In the embodiment, the control apparatus 50 is electrically (electrically conductive) connected to the robot main body 1 and the camera 30 via electrical wiring (not shown). Therefore, the electric signal from the above described optical receiving unit 33 is input to the control apparatus 50 through the electrical wiring. Note that the control apparatus 50 may be connected to the robot main body 1 and the camera 30 via wired communication or wireless communication. In this case, for example, a wireless transmitter may be connected to the optical receiving unit 33. Further, a display device including a monitor such as a display, an input device including e.g. a mouse and keyboard, etc. may be connected to the control apparatus 50.

As above, the outline of the respective parts of the robot 100 is explained. As below, the optical space transmission section 6 (first optical space transmission section) will be described in detail.

Detailed Description of Optical Space Transmission Section

Figure 4:
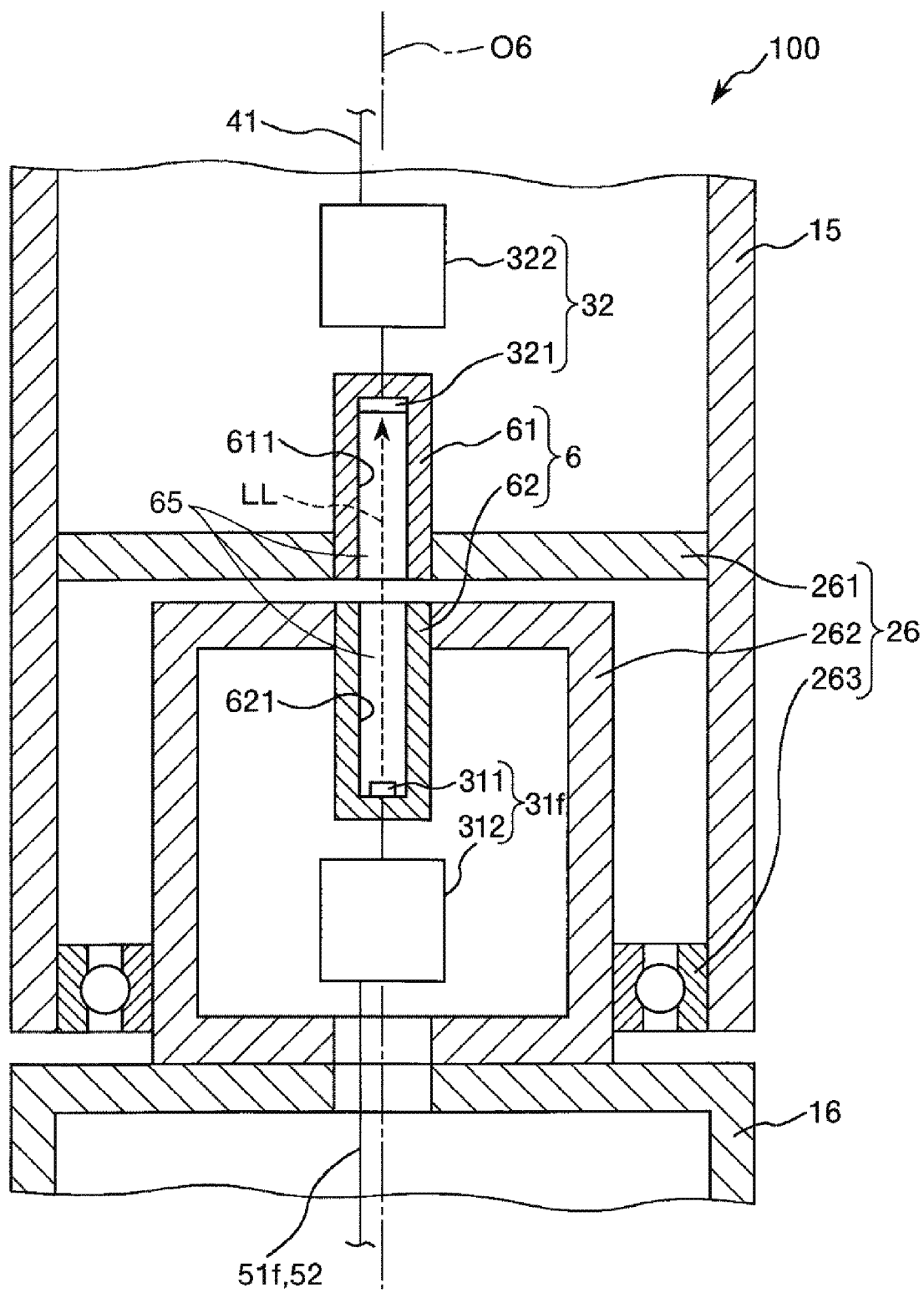
FIG. 4 is a sectional view of a joint part (second joint part) of the robot shown in FIG. 1.

FIG. 4 is a sectional view of the joint part (second joint part) of the robot shown in FIG. 1.

As shown in FIG. 4, the joint part 26 has a first member 261 fixed to the fifth arm 15, a second member 262 fixed to the sixth arm 16, and a bearing 263 provided between the members. Further, in the joint part 26, the optical space transmission section 6 (optical rotary joint) having two reflection members 61, 62 placed to be divided on the first member 261 side and the second member 262 side is provided.

Here, the distal end portion of the fifth arm 15 has a tubular shape and the first member 261 is placed inside of the distal end portion of the fifth arm 15 and has a plate-like shape along a plane perpendicular to the sixth rotation axis O6. Further, the second member 262 is formed by a shaft body having a hollow portion and inserted into the distal end portion of the fifth arm 15, and has a distal end surface contactlessly facing the plate surface of the first member 261. The bearing 263 is placed between the inner circumferential surface of the distal end portion of the fifth arm 15 and the outer circumferential surface of the second member 262, and supports the second member 262 rotatably about the sixth rotation axis O6 with respect to the fifth arm 15. Thereby, the sixth arm 16 to which the second member 262 is fixed is also supported rotatably about the sixth rotation axis O6 with respect to the fifth arm 15. Note that the shapes of the first member 261 and the second member 262 are not limited to the illustrated shapes. Or, the first member 261 may be integrally formed with the fifth arm 15. Further, the second member 262 may be integrally formed with the sixth arm 16.

Within the fifth arm 15, the above described optical transmitting and receiving unit 32 is placed on the opposite side to the second member 262 with respect to the first member 261. The optical transmitting and receiving unit 32 has a light receiving device 321 such as a photodiode and a unit 322 electrically (electrically conductive) connected to the light receiving device 321. Note that, though not illustrated, the unit 322 is optically (optically communicably) connected to the optical receiving unit 33 via the optical fiber 41, and includes a light emitting device (e.g. semiconductor laser, light emitting diode, or the like) and a circuit that drives the light emitting device based on the electric signal to emit an optical signal according to the electric signal of the light receiving device.

Within the second member 262 or sixth arm 16, the above described optical transmitting unit 31f is placed. The optical transmitting unit 31f has a light emitting device 311 such as a semiconductor laser or light emitting diode and a unit 312 electrically (electrically conductive) connected to the light emitting device 311. Note that, though not illustrated, the unit 312 is electrically (electrically conductive) connected to the angle sensor 131f and the camera 30 via the electrical wires 51f, 52, and includes a circuit that drives the light emitting device 311 based on the electric signal so that the light emitting device 311 may emit an optical signal according to the electric signal.

In the joint part 26, the optical space transmission section 6 (first optical space transmission section) is provided. The optical space transmission section 6 has the reflection member 61 in a tubular shape with a bottom provided in the first member 261 and the reflection member 62 in a tubular shape with a bottom provided in the second member 262, which rotates with respect to the first member 261.

The reflection members 61, 62 each has the tubular shape with the bottom with one end opened and the other end closed. Further, the reflection members 61, 62 are provided with the openings (one ends) facing each other so that the axis lines may be aligned with each other. In the embodiment, the reflection members 61, 62 are placed so that the respective axis lines may coincide with the sixth rotation axis O6. Thereby, even when the reflection members 61, 62 relatively rotate about the sixth rotation axis O6 with the relative rotation of the fifth arm 15 and the sixth arm 16 about the sixth rotation axis O6, the openings of the reflection members 61, 62 facing each other may be kept.

Further, inner surfaces 611, 612 (inner circumferential surfaces) of the reflection members 61, 62 respectively have light reflectivity, and internal spaces of the reflection members 61 and 62 form a light guide path 65 that repeats reflection by those inner surfaces 611, 612 (inner circumferential surfaces) and propagates light along the axis line direction. In the embodiment, the reflection member 62 propagates light from the bottom portion side toward the opening side thereof and the reflection member 61 propagates light from the opening side toward the bottom portion side thereof. Note that the internal spaces of the reflection members 61, 62 are filled with a gas at the atmospheric pressure (more specifically, the air), however, the reflection members 61, 62 may be filled with a transparent material such as a resin material or glass material. In this case, the transparent material forms the light guide path 65, and the light guide path 65 and the space between the reflection member 61 and the reflection member 62 form "optical space transmission section".

Inside of the bottom portion (the upper end portion in FIG. 4) of the reflection member 61, the light receiving device 321 of the optical transmitting and receiving unit 32 is placed and, on the other hand, inside of the bottom portion (the lower end portion in FIG. 4) of the reflection member 62, the light emitting device 311 of the optical transmitting unit 31f is placed. Thereby, light LL from the light emitting device 311 may be propagated in the internal spaces of the reflection members 61, 62 and received by the light receiving device 321.

The constituent materials of the reflection members 61, 62 are not particularly limited as long as the inner surfaces of the reflection members 61, 62 have excellent reflectivity for the light LL, but includes e.g. metal materials, glass materials, resin materials, ceramics materials, etc. Further, the inner surfaces of the reflection members 61, 62 may be coated with metal films of silver, aluminum, or the like with excellent light reflectivity.

Note that the shapes of the reflection members 61, 62 are not limited to the illustrated shapes as long as the light LL from the light emitting device 311 may be received by the light receiving device 321. Further, in the drawing, the reflection member 61 and the reflection member 62 are separated, however, the reflection member 61 and the reflection member 62 may be in contact or another member may intervene between the reflection member 61 and the reflection member 62. Or, depending on the relative orientation, distance, or the like of the light emitting device 311 and the light receiving device 321, at least one of the reflection members 61, 62 may be omitted or both may be omitted. When both of the members are omitted, the space between the light emitting device 311 and the light receiving device 321 may be regarded as forming "optical space transmission section". Or, the optical transmitting and receiving unit 32 may be omitted. In this case, an optical component such as a lens that collects the light LL from the light emitting device 311 to the optical fiber 41 may be provided.

This optical space transmission section 6 has no problem of torsion due to rotation compared to the optical wires 42a to 42e, and thus, is suitable to be provided in a part like the joint part 26 (second joint part) in which the fifth arm 15 and the sixth arm 16 are coupled to rotate about the sixth rotation axis O6.

As described above, the robot 100 includes the robot arm 10 having the joint parts 21 to 25 as the first joint parts and the joint part 26 as the second joint part located closer to the distal end side than the joint parts 21 to 25, the optical fiber 41 that performs optical communications within the joint parts 21 to 25, and the optical space transmission section 6 (first optical space transmission section) that performs optical space transmission within the joint part 26.

According to the robot 100, the optical fiber 41 performs optical communications within the joint parts 21 to 25, and thereby, communication characteristics with low loss by the optical fiber 41 may be utilized. Further, the optical space transmission section 6 performs optical space transmission within the joint part 26, and thereby, the degree of freedom of design of the joint part 26 (e.g. the degree of freedom of not only the routing of wires for optical communications but also routing of electrical wires) is higher and, as a result, the joint part 26 may be made smaller and lighter. As described above, the robot 100 may realize better communication performance with the smaller and lighter-weight joint part 26. Note that, here, the respective joint parts 21 to 25 may be regarded as "first joint parts" or an arbitrary one of the joint parts 21 to 25 may be regarded as "first joint part".

Here, the robot arm 10 has the plurality of joint parts 21 to 26 and the joint part 26 (second joint part) is the joint part on the most distal end side of the plurality of joint parts 21 to 26. Generally, in a robot arm having a plurality of joint parts, the joint part on the most distal end side is rotatable in a larger angle range. If an optical fiber is used for the joint part on the most distal end side, bending and torsion of the optical fiber may easily go beyond an allowable range. Accordingly, the optical space transmission section 6 is provided in the joint part 26 on the most distal end side, and thereby, the problem in the case using the optical fiber may be solved.

That is, the rotatable angle range from the reference state of the joint part 26 with the optical space transmission section 6 provided therein is larger than the rotatable angle ranges from the reference states of the joint parts 21 to 25 with the optical fiber 41 provided therein. Thus, the optical fiber 41 is used in the joint parts 21 to 25 having the smaller rotatable angle ranges within the ranges of the torsion angle and the bending angle allowed by the optical fiber 41, and thereby, communication accuracy may be made better without damage on the optical fiber 41. Further, the optical space transmission section 6 is used in the joint part 26 having the larger rotatable angle range beyond the ranges of the torsion angle and the bending angle allowed by the optical fiber 41, and thereby, optical communications in the joint part 26 can be performed.

From the viewpoint, it is preferable to use the optical fiber 41 in a joint part rotatable in a range smaller than 180° from a reference state. On the other hand, it is preferable to use the optical space transmission section 6 in a joint part rotatable in a range equal to or larger than 180° from a reference state.

Further, it is preferable to connect the end effector 20 to the side closer to the distal end than the joint part (second joint part) in the robot arm 10. Thereby, for example, a signal of a sensor or the like provided in the end effector 20 may be transmitted to the optical fiber 41 side via the optical space transmission section 6.

The robot 100 includes the angle sensor 131*f* and the camera 30 as the sensors provided on the side closer to the distal end than the joint part 26 (second joint part) of the robot arm 10. Thereby, the signals from the angle sensor 131*f* and the camera 30 may be transmitted to the optical fiber 41 side via the optical space transmission section 6. Note that the sensors that generate the signals used for the transmission in the optical space transmission section 6 are not limited to the angle sensor 131*f* and the camera 30, but may be e.g. another sensor such as a force sensor. The camera 30 is provided as appropriate, and may be omitted.

In the embodiment, the robot arm 10 has the fifth arm 15 and the sixth arm 16 as the two arms provided rotatably via the joint part (second joint part). Further, the optical space transmission section 6 has the light emitting device 311 provided on the side of one arm (sixth arm 16) of the fifth arm 15 and the sixth arm 16 and outputting the light LL and the light receiving device 321 provided on the side of the other arm (fifth arm 15) of the fifth arm 15 and the sixth arm 16 and receiving the light LL from the light emitting device 311 (see FIG. 4). Thereby, the electric signal may be converted into the optical signal and the optical space transmission may be performed using the light emitting device 311. Further, the received optical signal may be once converted into the electric signal and necessary processing (e.g. amplification) may be performed thereon, and deterioration of communication characteristics (light intensity reduction) due to the optical space transmission may be reduced using the light receiving device 321.

The optical space transmission section 6 has the reflection member 62 as a first lightguide part provided on the sixth arm 16 (one arm) side and guiding the light LL from the light emitting device 311 to the fifth arm 15 (the other arm) side and the reflection member 61 as a second lightguide part provided on the fifth arm 15 (the other arm) side and guiding the light LL from the reflection member 62 to the light receiving device 321. Thereby, the degree of freedom of placement of the light emitting device 311 and the light receiving device 321 may be increased, and thus, the degree of freedom of design of the joint part 26 may be increased.

Second Embodiment

Next, the second embodiment of the invention will be explained.

Figure 5:
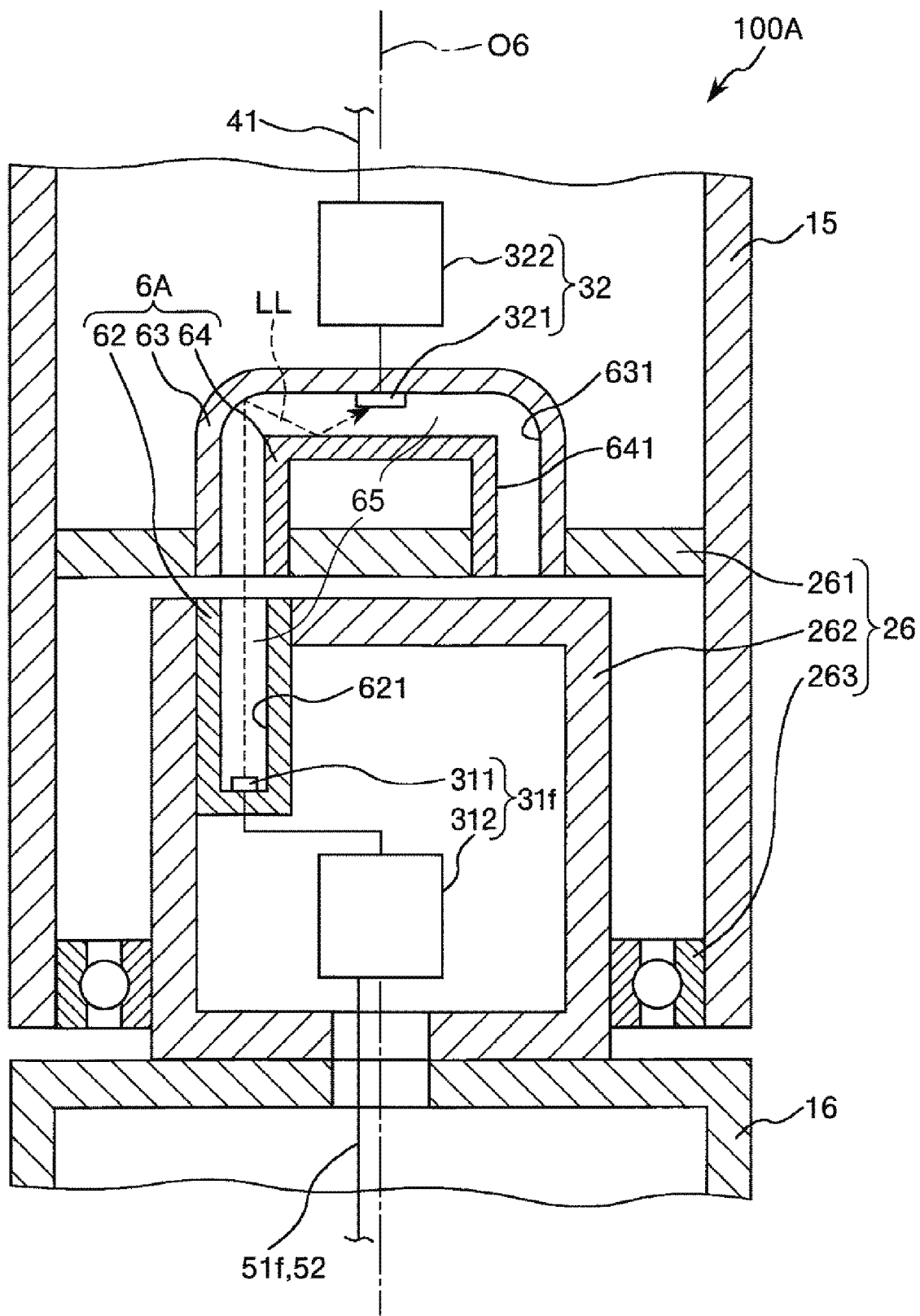
FIG. 5 is a sectional view showing a joint part of a robot according to a second embodiment of the invention.
Figure 6:
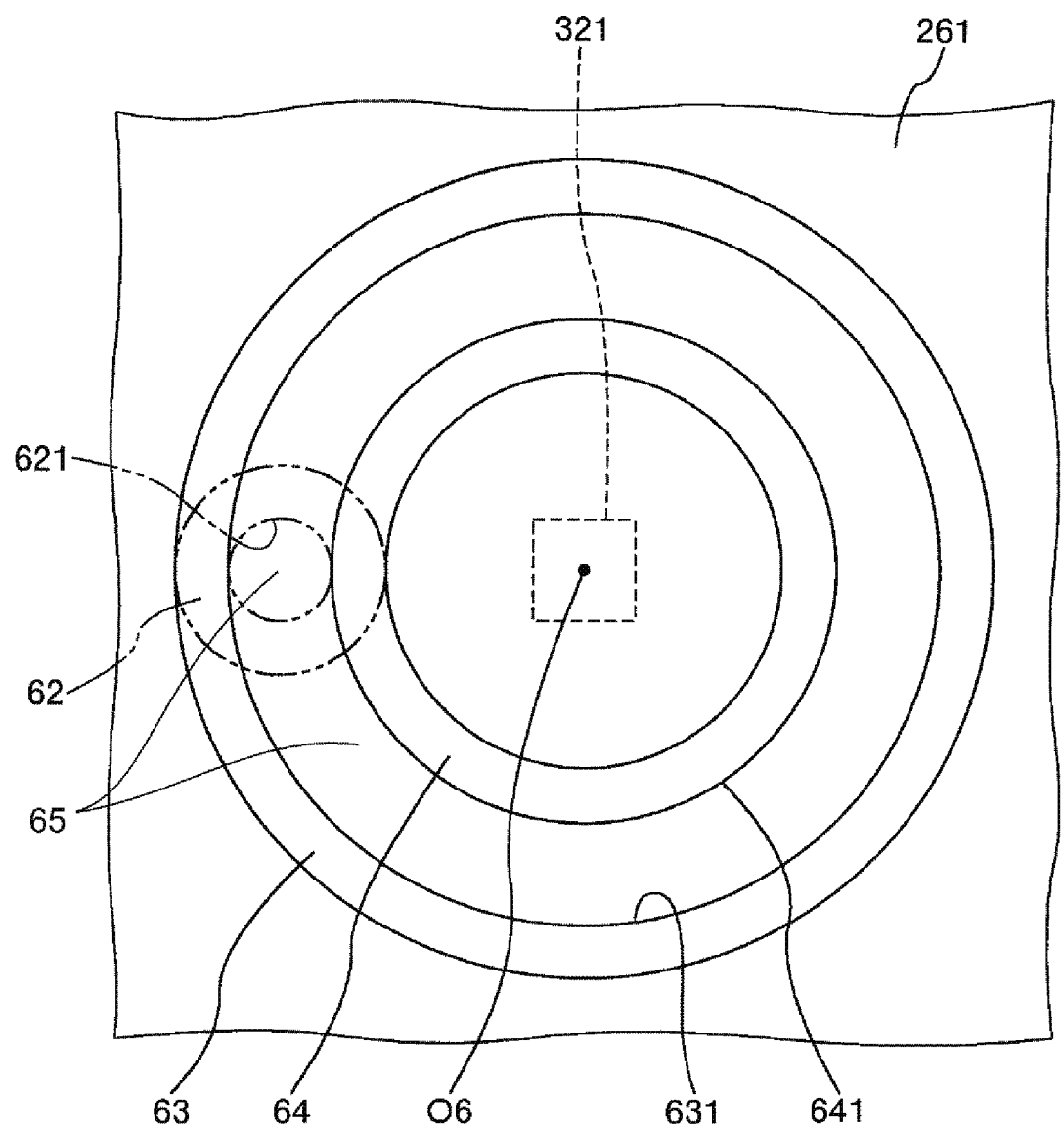
FIG. 6 is a cross-sectional view (a section cut orthogonally to a sixth rotation axis) of the joint part shown in FIG. 5.

FIG. 5 is a sectional view showing a joint part of a robot according to the second embodiment of the invention. FIG. 6 is a cross-sectional view (a section cut orthogonally to the sixth rotation axis) of the joint part shown in FIG. 5.

The embodiment is the same as the above described first embodiment except that the configuration of the optical space transmission section is different. In the following explanation, the embodiment will be explained with a focus on the differences from the above described first embodiment and the explanation of the same items will be omitted. Further, in FIGS. 5 and 6, the same configurations as those of the above described embodiment have the same signs.

In the joint part 26 (second joint part) of a robot 100A of the embodiment, an optical space transmission section 6A is provided. The optical space transmission section 6A has two cup-shaped reflection members 63, 64 provided in the first member 261 and the reflection member 62 in the tubular shape with the bottom provided in the second member 262.

The reflection members 63, 64 respectively have cup shapes opening downward in the FIG. 5. The reflection member 64 is placed inside of the reflection member 63. Here, the inner diameter (the length in the leftward and rightward directions in FIG. 5) of the reflection member 63 is larger than the outer diameter (the length in the leftward and rightward directions in FIG. 5) of the reflection member 64 and the depth (the length in the upward and downward directions in FIG. 5) within the reflection member 63 is larger than the height (the length in the upward and downward directions in FIG. 5) of the reflection member 64. Further, the reflection members 63, 64 are placed coaxially with each other so that the respective axis lines may be aligned with the sixth rotation axis O6. Therefore, a gap opening toward the reflection member 62 (cup-shaped space) is formed between an inner surface 631 of the reflection member 63 and an outer surface 641 of the reflection member 64. As shown in FIG. 6, the opening of the gap has an annular shape and has a width equal to or larger than the width of the opening of the reflection member 62. The internal space (the gap) surrounded by the reflection members 63 and 64 and the internal space of the reflection member 62 form the light guide path 65.

In the embodiment, as shown in FIGS. 5 and 6, the reflection member 62 is placed in a position separated from the sixth rotation axis O6 so that the opening (the upper end in FIG. 5) of the reflection member 62 may face a part of the opening (the lower end in FIG. 5) of the above described gap between the reflection members 63, 64 in the circumferential direction. Thereby, even when the reflection member 62 and the reflection members 63, 64 relatively rotate about the sixth rotation axis O6 with the relative rotation of the fifth arm 15 and the sixth arm 16 about the sixth rotation axis O6, the openings facing each other may be kept.

Further, the inner surface 631 of the reflection member 63 and the outer surface 641 of the reflection member 64 respectively have light reflectivity, and the space between the reflection member 63 and the reflection member 64 forms a part (the first member 261 side) of the light guide path 65 that repeats reflection by the inner surface 631 of the reflection member 63 and the outer surface 641 of the reflection member 64 and propagates light from the opening side toward the center portion side.

Inside of the bottom portion (the upper end portion in FIG. 5) of the reflection member 63, the light receiving device 321 of the optical transmitting and receiving unit 32 is placed. Thereby, light LL from the light emitting device 311 entering from the opening of the gap between the reflection members 63, 64 may be propagated and received by the light receiving device 321. Note that the light receiving device 321 may be placed outside of the bottom portion (the upper end portion in FIG. 5) of the reflection member 64. Or, the shapes of the inner surface of the reflection member 63 and the outer surface of the reflection member 64 may be appropriately set or an optical component such as a mirror may be appropriately placed on the inner surface of the reflection member 63 or the outer surface of the reflection member 64 so that the light LL entering the space between the reflection members 63, 64 may be received as much as possible by the light receiving device 321.

As described above, the robot 100A includes the robot arm 10 having the joint parts 21 to 25 as the first joint parts and the joint part 26 as the second joint part located closer to the distal end side than the joint parts 21 to 25, the optical fiber 41 that performs optical communications within the joint parts 21 to 25, and the optical space transmission section 6A that performs optical space transmission within the joint part 26.

According to the above described second embodiment, the better communication performance may be realized with the smaller and lighter-weight joint part.

Third Embodiment

Next, the third embodiment of the invention will be explained.

Figure 7:
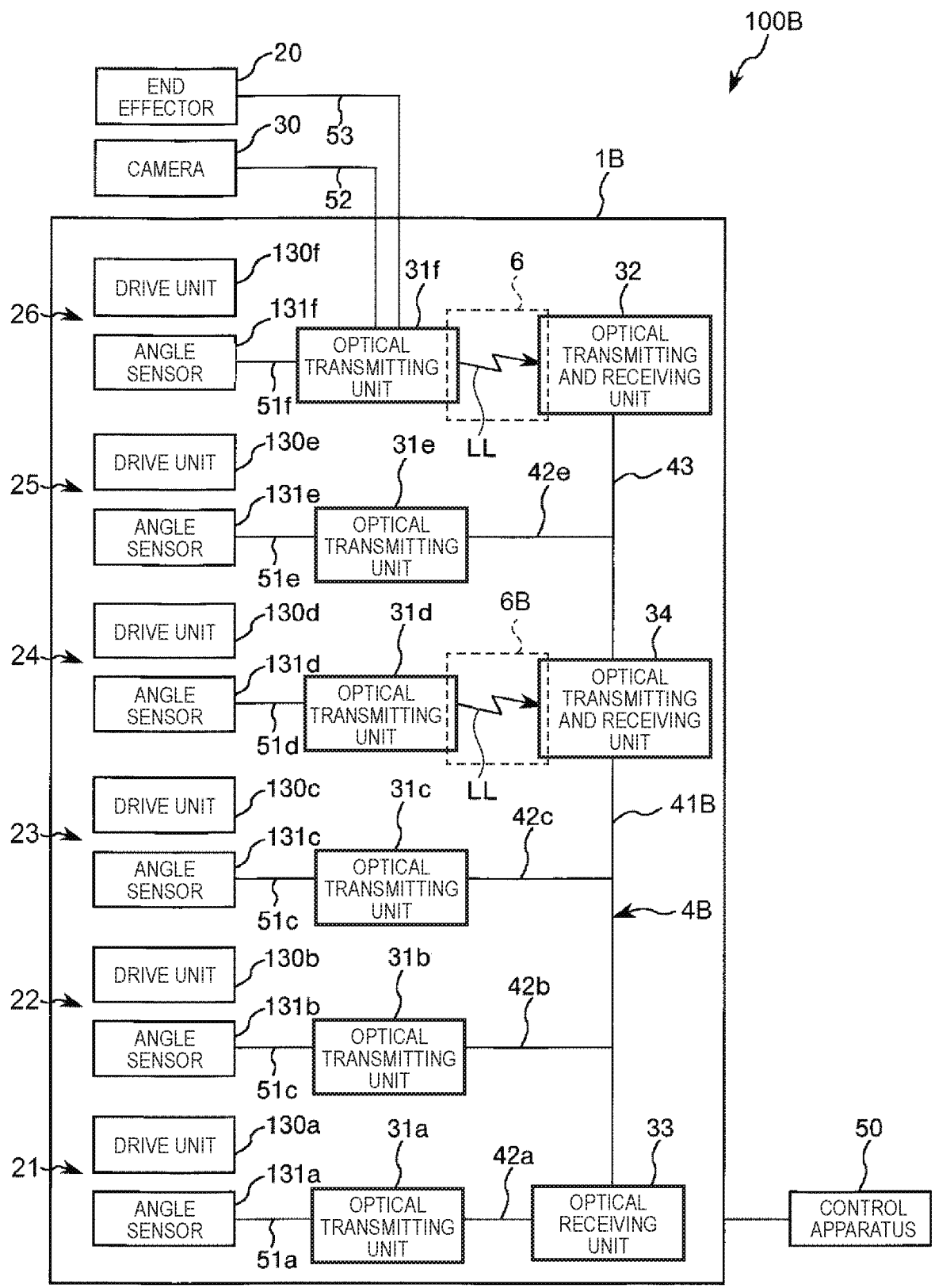
FIG. 7 is a block diagram showing a robot according to a third embodiment of the invention.
Figure 8:
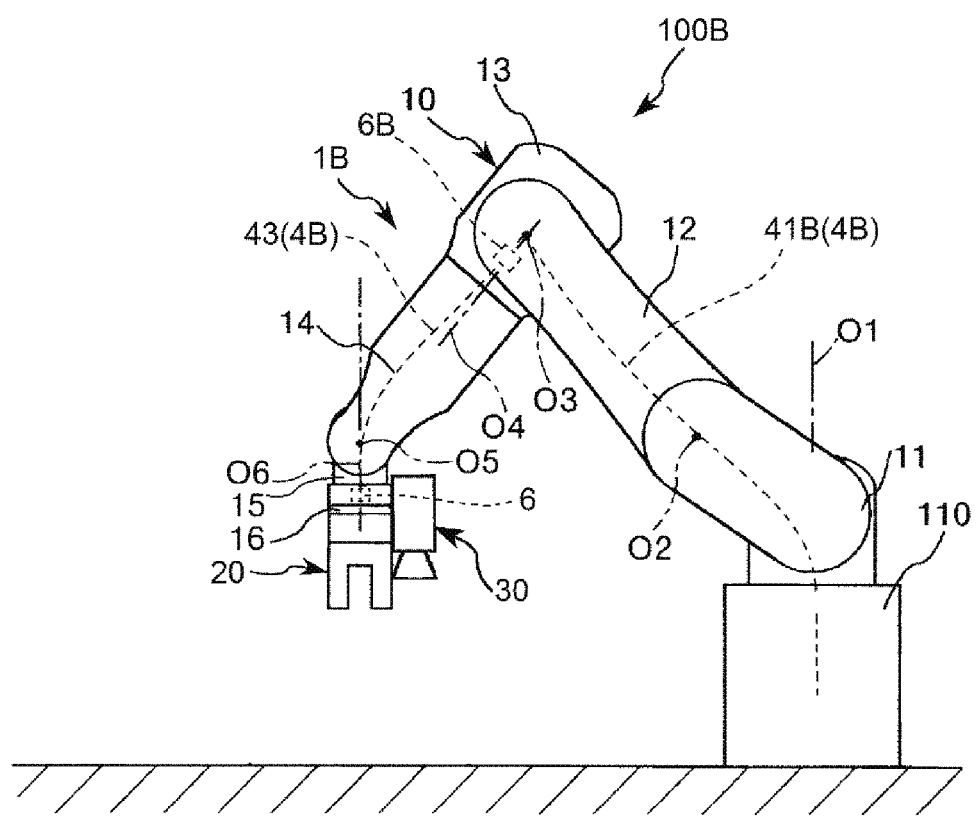
FIG. 8 is a side view of a robot main body of the robot shown in FIG. 7.

FIG. 7 is a block diagram showing a robot according to the third embodiment of the invention. FIG. 8 is a side view of a robot main body of the robot shown in FIG. 7.

The embodiment is the same as the above described first embodiment except that two optical space transmission sections are provided. In the following explanation, the embodiment will be explained with a focus on the differences from the above described first embodiment and the explanation of the same items will be omitted. Further, in FIGS. 7 and 8, the same configurations as those of the above described embodiments have the same signs.

As shown in FIG. 7, a robot 100B of the embodiment includes a robot main body 1B, the robot control apparatus 50 that controls driving of the robot main body 1B, and the camera 30.

Here, the robot main body 1B of the robot 100B has optical space transmission sections 6, 6B in joint parts (third, second joint parts) for the fourth, sixth rotation axes O4, O6, and can transmit information of the camera 30 etc. to the control apparatus 50 by optical communications via the optical space transmission sections 6, 6B.

More specifically, as shown in FIG. 7, the robot main body 1B has the drive units 130a to 130f, the angle sensors 131a to 131f, the optical transmitting units 31a to 31f, optical transmitting and receiving units 32, 34, the optical receiving unit 33, and an optical transmission unit 4B.

The optical transmitting and receiving unit 34 has the same configuration as the optical transmitting and receiving unit 32 and performs optical communications with the optical transmitting unit 31d by optical space transmission. The part that performs the optical space transmission forms the optical space transmission section 6B. The optical space transmission section 6B may have the same configuration as the optical space transmission section 6.

Here, the optical transmission unit 4B has an optical fiber 43 (optical wire) optically (optically communicably) connecting the optical transmitting and receiving unit 32 and the optical transmitting and receiving unit 34 and an optical fiber 41B (optical wire) optically (optically communicably) connecting the optical transmitting and receiving unit 34 and the optical receiving unit 33. As shown in FIG. 8, the optical fibers 41B, 43 are respectively placed inside of the robot arm 10. Further, the optical fiber 41B passes through inside of the respective above described joint parts 21 to 23 (the joint parts for the first to third rotation axes O1 to O3). The optical fiber 43 passes through inside of the above described joint part 25 (the joint part for the fifth rotation axes O5). Note that the optical wires 42b, 42c are respectively optically (optically communicably) connected to the optical fiber 41B. Further, the optical wires 42e is optically (optically communicably) connected to the optical fiber 43.

As described above, the robot 100B includes the robot arm 10 having the joint parts 21 to 23, 25 as the first joint parts, the joint part 26 as the second joint part located closer to the distal end side than the joint parts 21 to 25, and the joint part 24 as the third joint part, the optical fibers 41B, 43 that perform optical communications within the joint parts 21 to 23, 25, the optical space transmission section 6 that performs optical space transmission within the joint part 26, and the optical space transmission section 6B that performs optical space transmission within the joint part 24.

As described above, the robot arm 10 of the robot 100B has the joint part 24 as the third joint part placed between the joint parts 21 to 23 (first joint parts) and the joint part (second joint part) and performing optical space transmission inside using the optical space transmission section 6B (second optical space transmission section). Thus, the optical space transmission is performed not only in the joint part 26 on the most distal end side but also in the other joint part 24 having the larger rotatable range of the plurality of joint parts 21 to 26 of the robot arm 10, and thereby, the problem in the case using the optical fiber may be solved.

According to the above described third embodiment, the better communication performance may be realized with the smaller and lighter-weight joint part.

As above, the robot according to the invention is explained with reference to the illustrated embodiments, however, the invention is not limited to those. The configurations of the respective parts may be replaced by arbitrary configurations having the same functions. Further, other arbitrary configurations may be added to the invention. Furthermore, the respective embodiments may be appropriately combined.

In the above described embodiments, the configuration of the robot as the six-axis robot is explained, however, the robot is not particularly limited to, but includes e.g. an articulated robot of not six axes (of five axes or less or seven axes or more), dual-arm robot, or scalar robot.

Further, in the above described embodiments, the cases where the optical space transmission sections and the optical fibers transmit optical signals based on the output signals of the sensors are explained as examples, however, the invention is not limited to those. For example, the optical space transmission section and the optical fiber transmit optical signals based on control signals of the drive circuit that drives the drive unit (motor). In this case, the distal end side and the proximal end side of the above described optical space transmission section may be reversed. In the case where bidirectional transmission (bidirectional communication) is performed with the transmission of the optical signals based on the output signals of the sensors, the light emitting devices and the light receiving devices may be provided on both the distal end side and the proximal end side of the optical space transmission section.

The entire disclosure of Japanese Patent Application No. 2017-069273, filed Mar. 30, 2017 is expressly incorporated by reference herein.

What is claimed is:

1. A robot comprising:
a robot arm having a joint therein, the joint including a first joint part and a second joint part, the second joint part being located closer to a distal end side of the robot arm than the first joint part, and the second joint part being rotatable relative to the first joint part;
an optical fiber that performs optical communications within the first joint part; and
a first optical space transmission section that performs optical space transmission to the optical fiber within the first joint part, wherein the first optical space transmission section includes a light source disposed within a reflective housing in the second joint part and a light receiver disposed within a reflective housing in the first joint part, the first reflective housing and the second reflective housing defining a light guide path from the light source to the light receiver, and the first optical space transmission section is configured to perform optical space transmission from the light source to the light receiver as the second joint part rotates relative to the first joint part.

2. The robot according to claim 1, wherein a joint part on the most distal end side of the robot arm is the second joint part.

3. The robot according to claim 1, further comprising an end effector connected to a distal end of the robot arm.

4. The robot according to claim 1, further comprising a sensor provided on a side closer to a distal end of the robot arm than the second joint part.

5. The robot according to claim 1, wherein the robot arm has a third joint part located between the first joint part and the second joint part, and
a second optical space transmission section that performs optical space transmission within the third joint part is provided.

6. The robot according to claim 1, wherein the robot arm has two arms rotatably provided via the second joint part,
the light source is provided on a first arm side of the two arms and outputs light, and
the light receiver is provided on a second arm side of the two arms and receives light from the light source.

7. The robot according to claim 6, wherein the first optical space transmission section has:
a first lightguide part provided on the first arm side and guiding the light from the light source to the second arm side; and
a second lightguide part provided on the second arm side and guiding light from the first lightguide part to the light receiver.

* * * * *